J. E. GODDARD.
DRIVE SHAFT.
APPLICATION FILED MAR. 27, 1920.
1,387,384.
Patented Aug. 9, 1921.
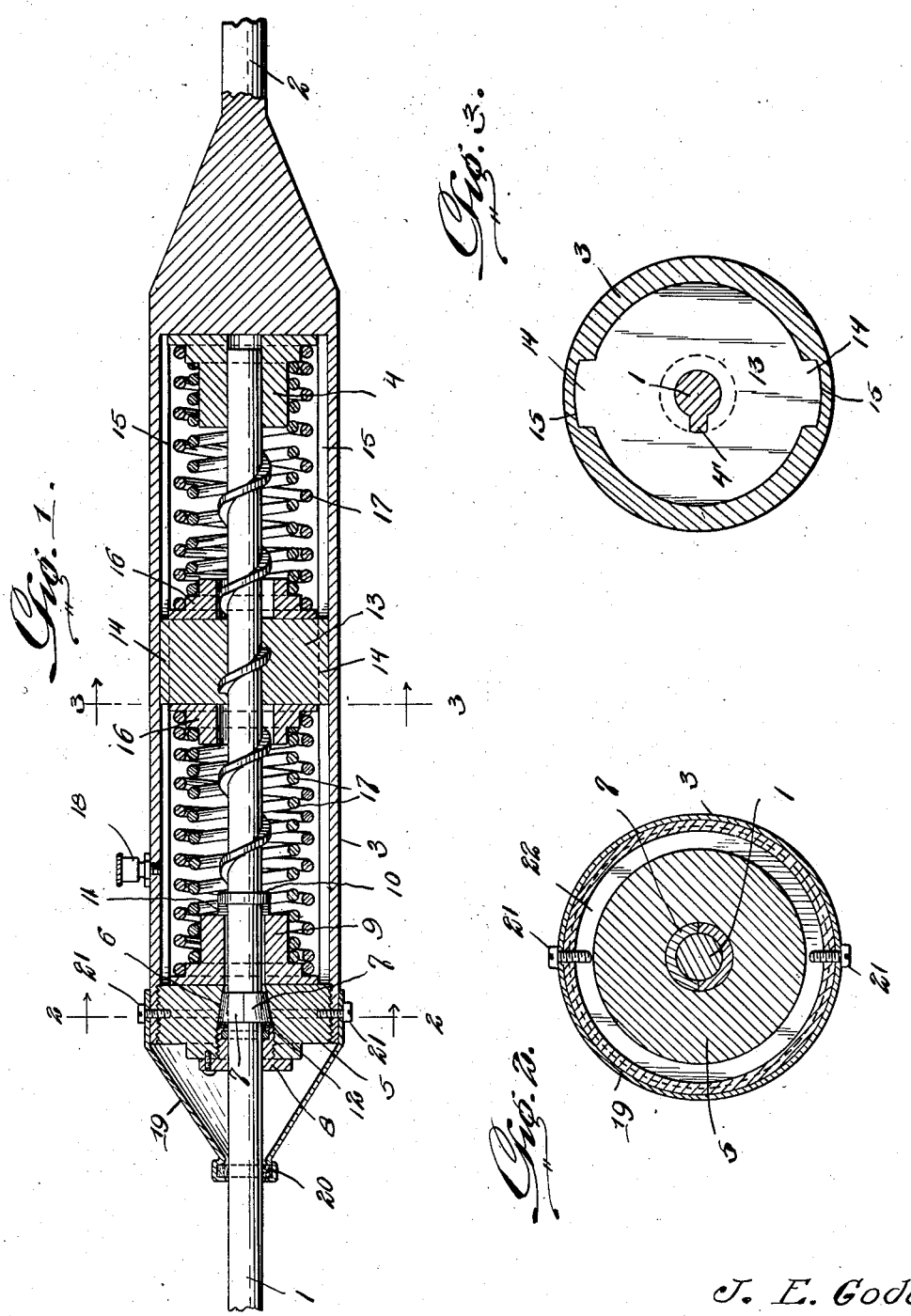
J. E. Goddard
INVENTOR
BY Victor J. Evans
ATTORNEY

UNITED STATES PATENT OFFICE.

JAMES E. GODDARD, OF BALTIMORE, MARYLAND, ASSIGNOR OF ONE-HALF TO MICHAEL CHONKICH, OF BALTIMORE, MARYLAND.

DRIVE-SHAFT.

1,387,384.     Specification of Letters Patent.     Patented Aug. 9, 1921.

Application filed March 27, 1920. Serial No. 369,215.

*To all whom it may concern:*

Be it known that I, JAMES E. GODDARD, a citizen of the United States, residing at Baltimore, Maryland, have invented new and useful Improvements in Drive-Shafts, of which the following is a specification.

This invention relates to transmission means for automobiles and the like, the principal object of the invention being to provide means for providing a flexible connection between the driven shaft and the drive shaft so as to prevent undue strain on the driven shaft by the sudden starting of the drive shaft.

Another object of the invention is to provide a spring connection between the two parts, the spring means being so arranged that they must be placed under a certain tension by the drive shaft before they will transmit the motion to the driven shaft.

A further object of the invention is to provide means whereby the shafts may be driven in either direction so as to move the automobile forwardly or rearwardly, the driven shaft being flexibly connected to the drive shaft in both instances.

A further object of the invention is to provide means whereby the transmission elements may be readily adjustable on the drive shaft so as to take up any play between the parts.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional through one form of the invention.

Fig. 2 is a section on line 2—2 of Fig. 1.

Fig. 3 is a section on line 3—3 of Fig. 1.

In these views 1 indicates the drive shaft and 2 the driven shaft. A casing 3 is formed at the end of shaft 2 and this casing receives the end portion of shaft 1, this portion being provided with the worm 4'. The extremity of shaft 1 is journaled in a shouldered projection 4 located in the bottom of the casing and the outer end of the casing is closed by a screw threaded plug 5 which is provided with a conical hole 6 in its center through which the shaft 1 passes. A two-piece bearing 7 of frusto-conical shape is arranged in said hole around said shaft and this bearing is held in the hole by means of the nut 8 engaging the cylindrical outer part of the hole. A member 9 made similar to the member 4 engages the inner face of the plug 5 and this member is provided with a central opening through which the shaft passes. A collar 10 formed on said shaft is slightly spaced from the inner end of the member 9 and this space is filled by the shims 11 and other shims 12 are placed in the space between the bearing 7 and the nut 8. By this arrangement end thrust of the parts is prevented. If the parts should become worn some of the shims may be removed from between the collar and member 9 and placed between the bearing and the nut. A member 13 having a threaded central bore to receive the threaded part of the drive shaft is located within the casing and is slidably mounted therein but held against rotation by having its diametrically arranged projections 14 engaging grooves 15 in the casing. A shouldered member 16 engages each face of the member 13 and these members 16 and the members 4 and 9 form chairs for the coil springs 17. These springs are arranged in pairs, a pair on each side of the member 13 so that the movement of said member 13 in either direction is resisted by said springs. The casing is adapted to be filled with lubricant by way of the inlet 18 and a cap 19 incloses the outer end of the casing, the shaft 1 passing through the small end of the cap which carries a packing ring 20. The cap is secured to the casing by means of the screws 21 which pass through the walls of the casing and engage a groove 22 in the plug 5. Thus these screws serve to lock the plug in position.

It will be seen that when the shaft 1 begins to rotate in either direction the worm thereon engaging the member 13 will cause said member to move in the casing without rotating the casing or the driven shaft which carries the same. This movement will tension the springs and as soon as this tension becomes greater than the load upon the shaft 2 said shaft and casing will begin to turn. If the load should become greater than the strength of the springs then the member 13 would continue to slide along the casing until the two chairs engage each other and further movement of the member 13 will be prevented and the shaft 2 would be compelled to rotate with the shaft 1. The chairs are made of sufficient length to prevent damage to the springs if this action should occur. The two shafts are flexibly connected together by the springs so that the shocks incident to the sudden starting or stopping of one shaft will be absorbed by the springs and will not be imparted to the other shaft.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a drive shaft having a worm thereon and a driven shaft, a casing carried by the driven shaft and receiving the wormed portion of the drive shaft, a nut member on said portion, said casing having longitudinally extending grooves in its inner walls and the nut member having projections engaging said grooves, a screwed plug closing the open end of the casing and having a conical opening therein through which the drive shaft passes, a two-part conical bearing fitting in said opening and engaging the shaft, a nut for holding said bearing in place, chairs at the ends of the casing and on each face of the nut member, coiled springs having their ends bearing against said chairs, a collar on the drive shaft spaced from the end of the chair which engages the plug and shims located between said collar and the end of the chair and between the nut and the bearing.

2. In combination with a drive shaft having a worm thereon and a driven shaft, a casing carried by the driven shaft and receiving the wormed portion of the drive shaft, a nut member on said portion, said casing having longitudinally extending grooves in its inner walls and the nut member having projections engaging said grooves, a screw plug closing the open end of the casing, a cap fitting over said open end and having a small opening therein for receiving the drive shaft, means for holding the cap in position and preventing unscrewing of the plug, a bearing carried by the screw plug for the drive shaft, chairs at the ends of the casing and on each face of the nut member, a pair of coiled springs having their ends bearing against said shafts, one spring of each pair being of smaller diameter than the other spring to fit within the same and said chairs having portions of less diameters than the diameters of the small springs so that said portions will engage each other when the load is greater than the strength of the springs.

In testimony whereof I affix my signature.

JAMES E. GODDARD.